(12) United States Patent
Ishii

(10) Patent No.: US 7,805,000 B2
(45) Date of Patent: Sep. 28, 2010

(54) IMAGE PROCESSING FOR BINARIZATION OF IMAGE DATA

(75) Inventor: Hirotomo Ishii, Toyonaka (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 804 days.

(21) Appl. No.: 09/845,349

(22) Filed: May 1, 2001

(65) Prior Publication Data

US 2001/0035975 A1 Nov. 1, 2001

(30) Foreign Application Priority Data

May 1, 2000 (JP) .............................. 2000-132465
May 1, 2000 (JP) .............................. 2000-132466

(51) Int. Cl.
*G06K 9/00* (2006.01)

(52) U.S. Cl. ...................................... 382/165; 382/135

(58) Field of Classification Search ................. 382/135, 382/165, 237, 270–272; 358/465, 466, 2.99
See application file for complete search history.

(56) References Cited

U.S. PATENT DOCUMENTS

| 5,396,584 | A | * | 3/1995 | Lee et al. ..................... 345/589 |
| 5,434,953 | A | * | 7/1995 | Bloomberg ................. 345/670 |
| 5,687,252 | A | * | 11/1997 | Kanno et al. ................ 382/176 |
| 6,115,494 | A | | 9/2000 | Sonoda et al. |
| 6,766,056 | B1 | * | 7/2004 | Huang et al. ................ 382/190 |

FOREIGN PATENT DOCUMENTS

| JP | 07-296163 | 11/1995 |
| JP | 07-334610 | 12/1995 |
| JP | 08-184409 | 7/1996 |
| JP | 09-018707 A | 1/1997 |
| JP | 09-238256 | 9/1997 |
| JP | 09-282452 | 10/1997 |
| JP | 09-288732 | 11/1997 |
| JP | 10-210285 | 8/1998 |
| JP | 11-110545 | 4/1999 |
| JP | 11-120333 | 4/1999 |
| JP | 11-317869 | 11/1999 |

OTHER PUBLICATIONS

Office Action dated Dec. 18, 2007 in priority application.
A Notification of Reasons of Refusal issued in corresponding Japanese Patent Application No. 2000-132466, and translation thereof, May 22, 2007.

* cited by examiner

*Primary Examiner*—Brian Q Le
(74) *Attorney, Agent, or Firm*—Buchanan Ingersoll & Rooney PC

(57) ABSTRACT

In order to carry out an image processing with high precision by using a simple structure, an image processing apparatus is provided with an input unit, a storage unit, a binarization unit, and a determination unit. The input unit inputs image data of an image. The storage unit stores a first condition on absolute positions of pixels in the image and a second condition on positions of pixels relative to a target pixel. The binarization unit binarizes the target pixel based upon a color data of the target pixel and that of at least one related pixel to the target pixel to generate a binarized value. The at least one related pixel in the image satisfies the first and second conditions. The determination unit determines whether or not the image has a specified pattern, based upon the binarized values.

15 Claims, 9 Drawing Sheets

Fig.10

| DIVISION | THRESHOLD VALUE (R,G,B) |
|---|---|
| C≧150 | (253, 237, 125) |
| 150≧C≧120 | (242, 241, 0) |
| C<120 | (192, 190, 0) |

900

IMAGE PROCESSING FOR BINARIZATION OF IMAGE DATA

This application is based on applications Nos. 2000-132465 and 2000-132466 each filed on May 1, 2000, in Japan, the contents of which is incorporated by reference.

BACKGROUND OF THE INVENTION

1. Field of the Invention

The present invention relates to image processing for binarizing image data upon detection of a specified pattern.

2. Description of the Related Art

In recent years, with the developments of functions and performances of color copiers, it becomes possible to obtain a color copy with high quality even by using a commercial scanner, a computer, a color printer and the like. Therefore, it is necessary to provide an effective method for preventing the subsequent counterfeiting acts for paper money, and the like. One of the counterfeiting prevention methods is a technique for inhibiting the generation of an image resembling closely a paper money and the like, upon detection of a specified pattern at the time of copying.

However, an input image is a color image having a great amount of data, and it takes a long time to carry out the corresponding process on the image. From the practical point of view, the process needs to be performed at a high speed, with the result that the processing circuit becomes bulky, complex, and expensive. Moreover, since color hues of the image tend to change depending on scanning conditions, detection of a specified pattern using color discrimination requires a high-performance processing circuit, that is, an expensive circuit.

SUMMARY OF THE INVENTION

An object of the present invention is to provide an image processing operation with high precision by a simpler construction.

According to the present invention, based upon a color data of a target pixel contained in an image and a color data of at least one related pixel to the target pixel in the image, the target pixel is binarized to generate binarized value. Here, the related pixel satisfies a first condition on absolute positions of pixels and a second condition on positions of pixels relative to the target pixel.

Moreover, in accordance with another aspect of the present invention, a plurality of threshold values are held, and based upon a threshold value selected from these, the target pixel of the image is binarized.

It is an advantage of the present invention that by generating the binarized value in this manner, it is possible to obtain a binarized image that is more properly made by taking into account color information of the peripheral images than that simply binarized by using a single threshold value.

It is another advantage of the present invention that it is possible to obtain a binarized image that is more properly made than that simply binarized by using a single threshold value.

It is a further advantage of the present invention that by using the binarized image obtained through the process of the present invention, it becomes possible to positively determine whether or not a specified image exists in the original image more easily.

BRIEF DESCRIPTION OF THE DRAWINGS

These and other object and features of the present invention will become clear from the following description taken in conjunction with the preferred embodiments thereof with reference to the accompanying drawings, in which:

FIG. 10 is a threshold value table in which a plurality of threshold values are stored.

DETAILED DESCRIPTION OF THE INVENTION

Preferred embodiments of the present invention will be described hereinafter by referring to the accompanying drawings.

Embodiment 1

Figure 1:
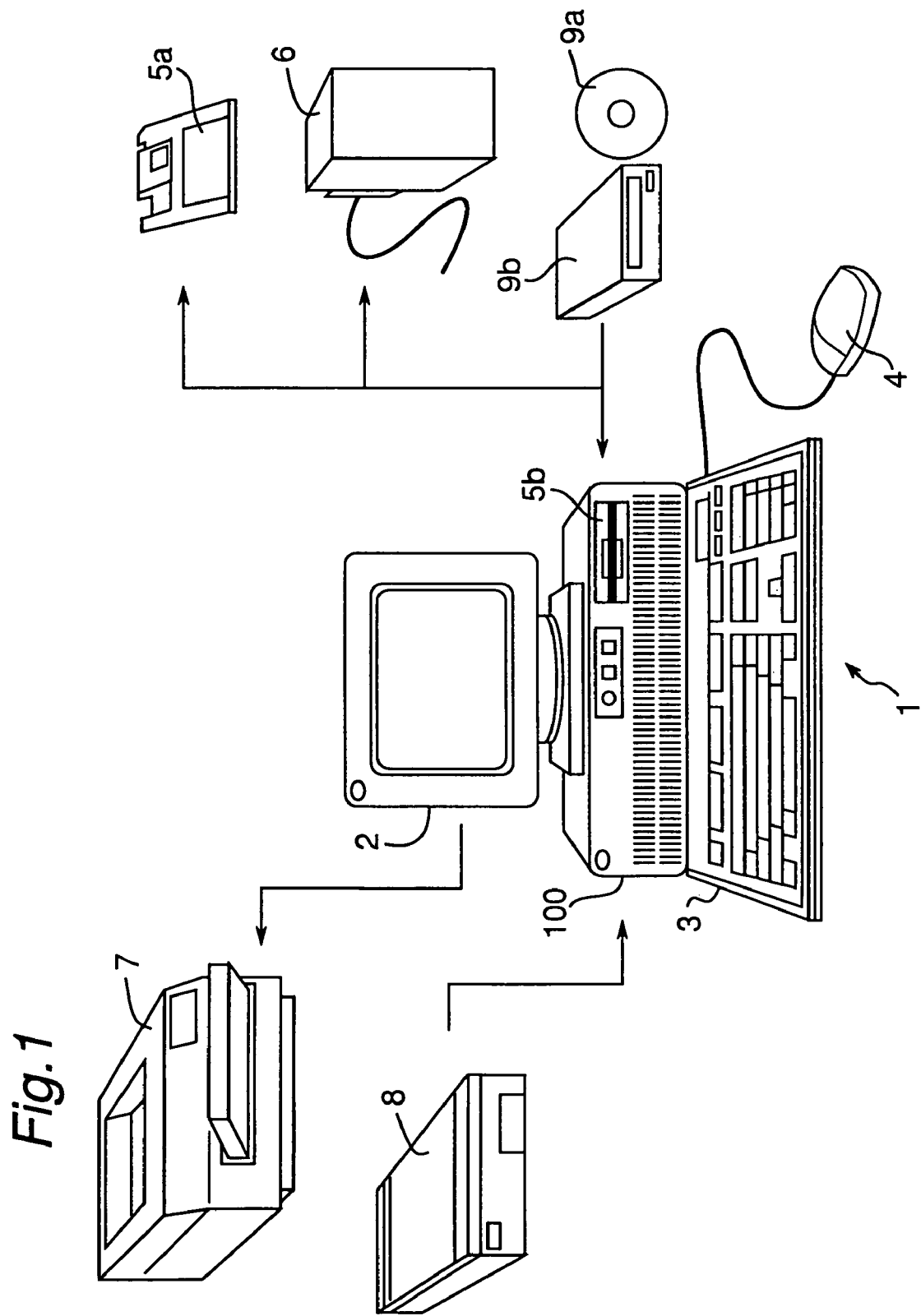
FIG. 1 is a drawing of a computer system.

FIG. 1 shows a computer system 1. Upon receipt of image data, a computer system 1 carries out a color printing process on the image data. In this process, it is determined whether or not a specified pattern containing a predetermined color (reference color) and a predetermined shape (reference shape) is formed on at least one portion of the image that is to be color-printed, and if, as a result, a specified pattern is contained, the generation of an image resembling closely the received image is inhibited.

The following description will discuss the computer system 1 that includes a computer serving as an image processing apparatus 100. Not limited to a so-called personal computer, such as a desk-top computer and a lap-top computer, a computer installed in a color copier may be included. The computer system 1 is provided with the image processing apparatus 100, a monitor 2 for displaying an output from the image processing apparatus 100, a keyboard 3 and a mouse 4 used for inputting information to the image processing apparatus 100, a printer 7 for printing images, a scanner 8 for inputting image data to the image processing device 100, a floppy disk drive 5b and a CD (or DVD) drive 9b. Besides these, the means for inputting image data also includes a network interface for receiving image data from another computer 6 and the like, through a network, an interface for inputting image data from a digital camera and the like, for example, an IEEE 1394 interface and the like (none of them are shown). Here, in the present embodiment, an explanation will exemplify a computer system. However, this is also applied to a color copier having a built-in image processing apparatus 100.

Figure 2:
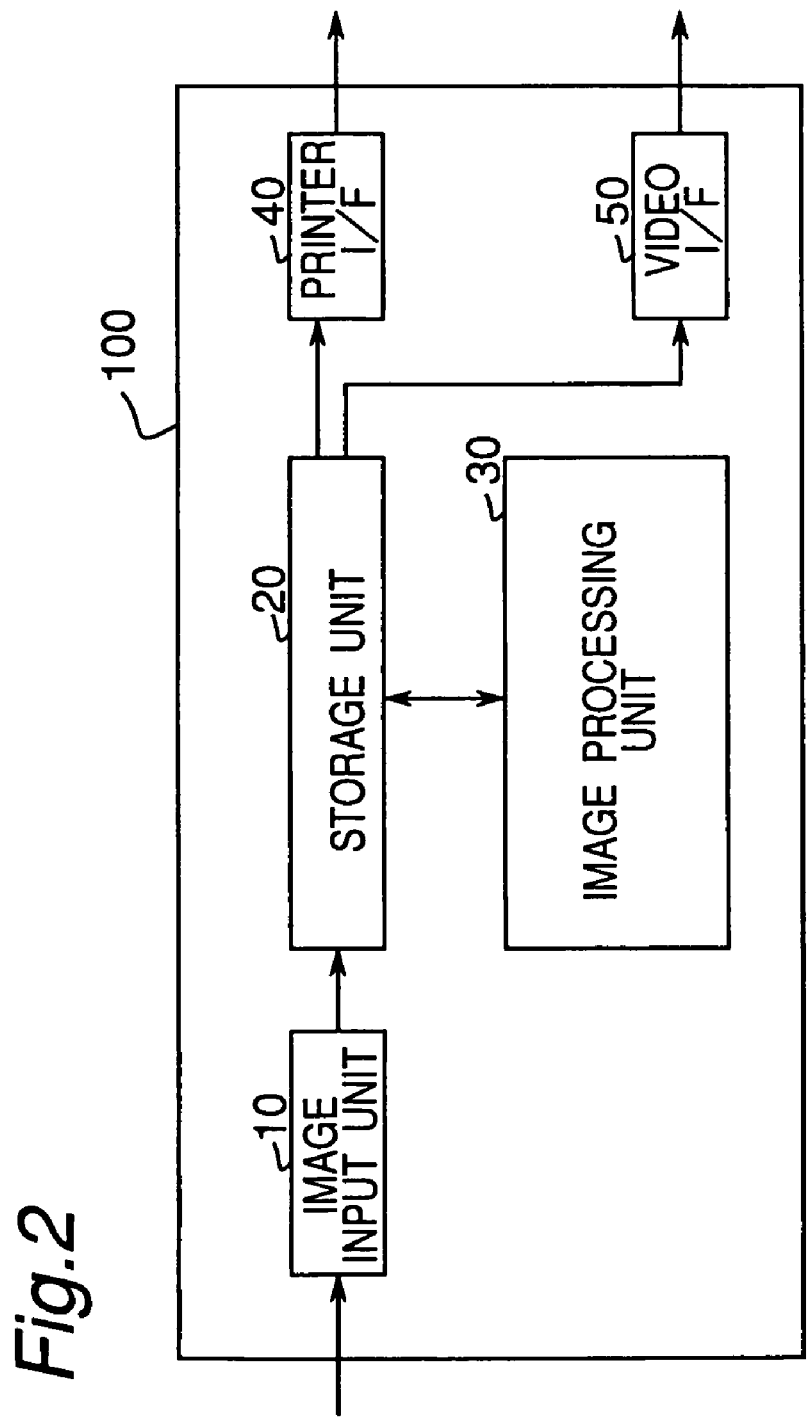
FIG. 2 is a block diagram of the construction of an image processing unit.

FIG. 2 shows a block diagram of the structure of the image processing apparatus 100. The image processing apparatus 100 is provided with an image input unit 10, a storage unit 20, an image processing unit 30, a printer interface 40 and an video interface 50. The image processing unit 30 is provided with a read only memory (hereinafter referred to as ROM) (not shown) for storing a computer program including an image processing algorithm and a CPU (not shown) that executes image processing, such as a detecting process for a specified pattern, in accordance with the program stored in the ROM.

Next, explanations will be given of the respective components of the above-mentioned image processing apparatus 100. The image input unit 10 is used for inputting image data to the image processing apparatus 100. The image data is composed of a plurality of pixels, each of which has a color data represented by a pixel value. Here, the greater the number of the pixels and the greater the number of colors represented by the color data, the higher the resolution in the corresponding image, while the smaller the number of the pixels, that is, the smaller the number of colors represented by the color data, the lower the resolution therein. The inputted image has a resolution of, for example, 600 dots per inch (dpi), or 300 dpi.

The storage unit 20 is a memory, a hard disk and the like, for storing the inputted image data. The storage unit 20 stores one or more threshold values that are used in association with a binarizing operation in the image processing unit 30 which will be described later, an absolute positional condition for defining absolute positions of pixels in the input image and a relative positional condition for defining a positions of pixels relative to the target pixel, which are used for selecting a relative pixel. Moreover, the storage unit 20 also stores a pixel specifying condition for directly specifying a position from the target pixel. A binarizing operation utilizing the absolute positional condition, the relative positional condition and the pixel specifying condition will be described later in detail.

The image processing unit 30 carries out an image processing on image data containing color data. In other words, the image processing unit 30 carries out processes described in step 302 to 308 in FIG. 3. In particular, in relation to the step 304 in FIG. 3, the image processing unit 30 gives either a value 1 or 0 to each pixel based upon the color data of the pixel and one threshold value selected from the plurality of threshold values. This process will be described later in detail.

The printer interface 40 is used in the case when image data is outputted to the printer 7 (FIG. 1), and also includes functions as a printer controller.

The video interface 50 is used in the case when image data is outputted to the monitor 2 (FIG. 1), and also includes functions as a general video card.

Figure 3:
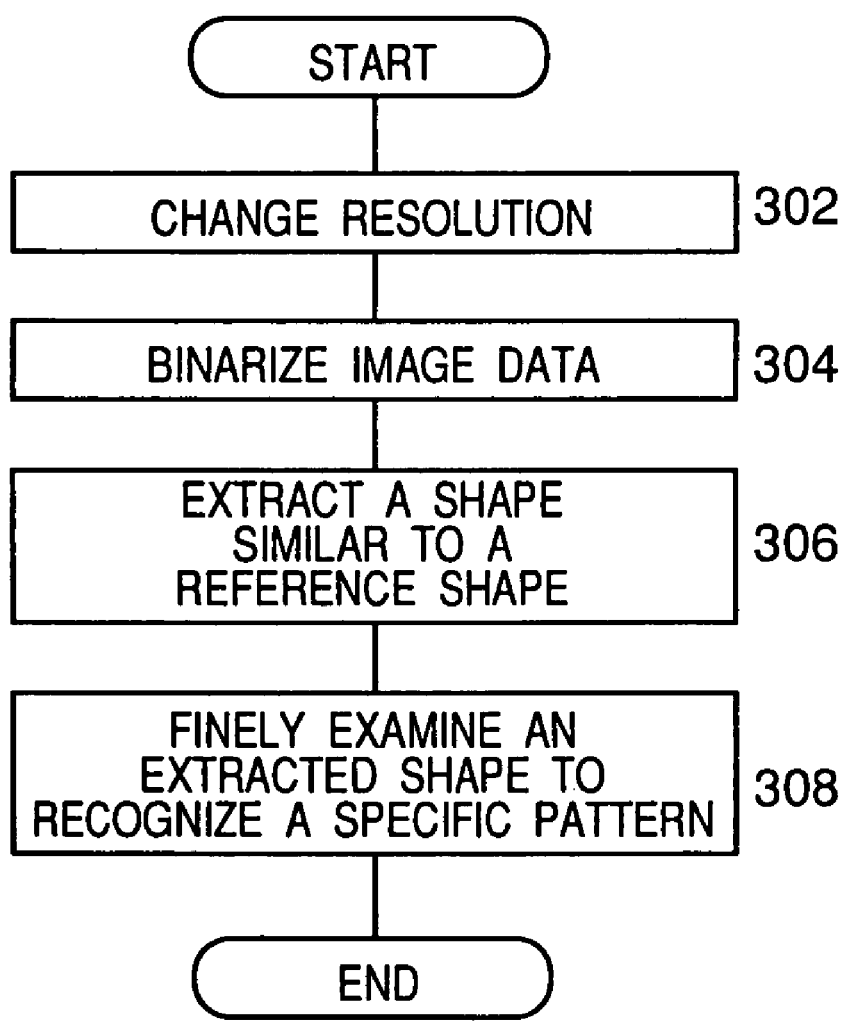
FIG. 3 is a flow chart of detecting processes for a specified pattern.

FIG. 3 shows a flow chart of a specified pattern detecting process that is executed by the CPU in the image processing unit 30 (FIG. 2). First, in order to reduce the amount of data to be dealt with, inputted image (hereinafter, referred to as "input image") is converted so as to have a lower resolution (step 302). Then, in order to determine whether or not any reference color is contained, the image data is binarized with respect to the reference color (step 304). Successively, in order to determine whether or not a specified pattern is contained, the image is scanned with respect to the image data that has been binarized with respect to the reference color, with a frame having a size for the reference shape being used; thus, any shape contained in the frame is extracted (step 306). This process is used for extracting any shapes (any shape closer to the reference shape) that are more likely to be the reference shape. Lastly, these shapes are more finely examined to determine whether or not any shape contained in the frame has the reference shape so that a specified pattern is detected (step 308).

With respect to the image processing apparatus 100 (FIG. 1) of the present invention, an explanation will be briefly given of the process of the step 304 for binarizing the image data with respect to the reference color. The reference color refers to a color of a specified pattern printed in paper money and the like, for preventing counterfeit, and this color is not limited to mono-color. More specifically, if a pixel value, which is a color data of a pixel) is greater than a threshold value, a value 1 is given to the pixel, while if smaller than the threshold value, a value 0 is given to the pixel. The threshold value is given as a reference for determining whether or not the pixel corresponds to the reference color. In the image processing apparatus 100, a plurality of threshold values are preliminarily prepared, and one of the threshold values is selected based upon a predetermined reference, and this is used at the time of the binarizing operation. Therefore, it is possible to obtain a binarized image by which a target area is more easily extracted. The binarizing operation by the image processing apparatus 100 of the present invention will be described below in more detail.

Figure 4:
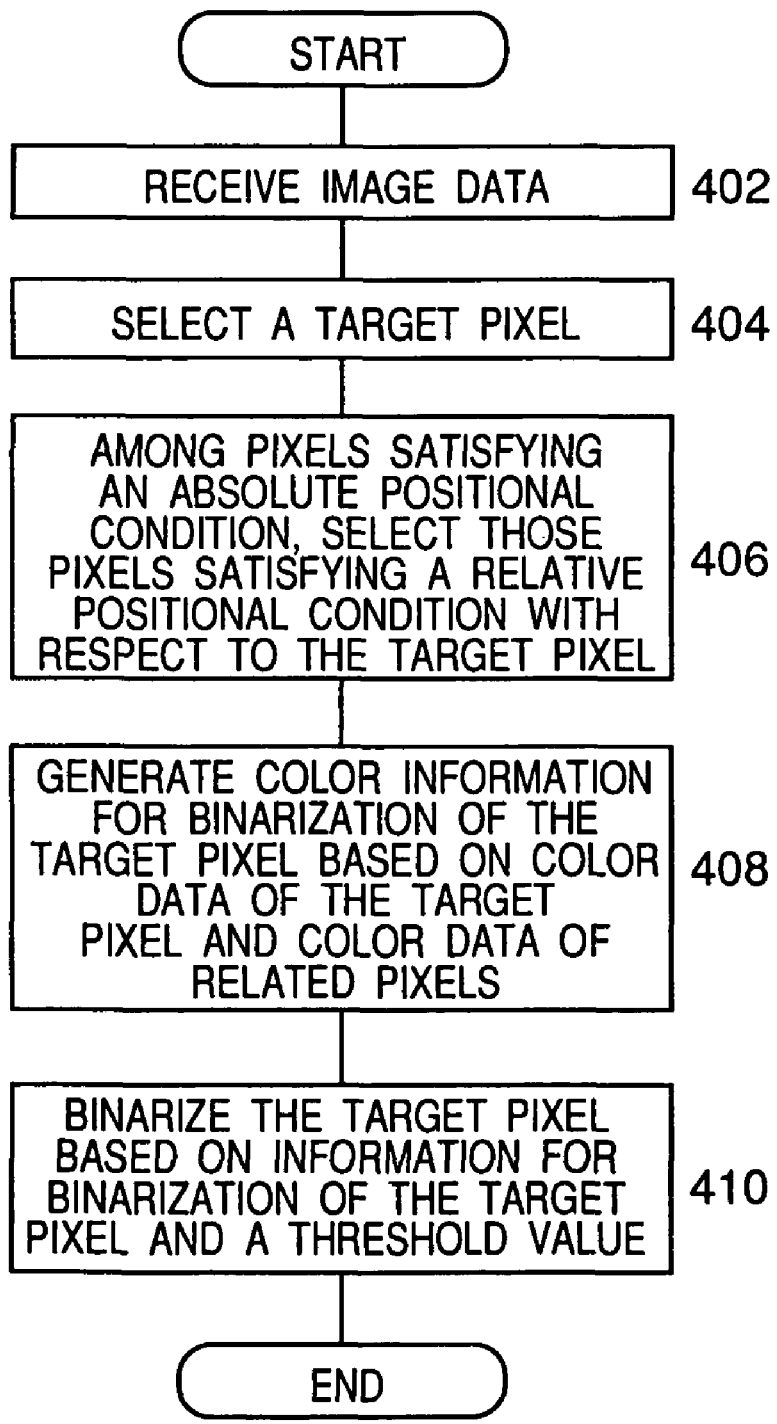
FIG. 4 is a flow chart of the processes of the image processing unit.

Referring to FIG. 4, the following description will discuss the binarizing operation. FIG. 4 is a flow chart that shows a binarizing operation in the detection of any specified pattern, which is a sub-routine of the step 304 in the flow chart of FIG. 3. First, the image processing apparatus 100 (FIG. 2) receives image data of an input image from the input unit 10 (FIG. 2)(step 402), and stores this in the storage unit 20 (FIG. 2). In this example, the resolution of the image is set to 300 dpi that is comparatively low, and the resolution converting step (step 302 in FIG. 3) for reducing the amount of processing is not particularly carried out. However, in the case when the input image has a comparatively high resolution such as 600 dpi, the resolution may be converted to 300 dpi and the like, so as to reduce the amount of processing. In order to carry out the resolution conversion, the image processing unit 30 (FIG. 2) is set to carry out a thinning process on the pixels of the image data.

Any of processes (steps 404 to 410) successively carried out by the image processing unit 30 (FIG. 2) after step 402 are processes related to the binarizing operation with respect to the reference color. In general, the binarizing operation is a process in which, based upon a color data of a pixel and a threshold value, either a value 0 or 1 is given to the pixel. For example, suppose that the binarizing operation is carried out with respect to yellow. Yellow can be represented quantitatively by using respective values of red (R), green (G) and blue (B). Here, all the pixels constituting an image can be represented by respective values (color data) of R, G and B. Therefore, based upon the respective R value, G value and B value of yellow as reference values, any pixel having respective values of R, G and B located within predetermined ranges from these values is determined as yellow, and 1 is given to this pixel. Even any one of the R, G and B values is located out of the predetermined range, this is determined as a non-yellow color, and 0 is given to this pixel. As shown by this example, with respect to one reference color, respective reference values exist for the respective three elements of R, G and B (hereinafter, referred to as "element threshold values"). In the present specification, "threshold value" refers to a set of element threshold values of the respective elements. The binarized image thus generated is formed by extracting only the pixels having the reference color. After this binarizing operation, the succeeding processes are carried out based upon the pixel value of 0 or 1. Therefore, it is possible to greatly reduce the amount of data to be dealt with, as compared with a case in which the color data, as it is, is used in the processes.

According to the present invention, the image processing unit 30 (FIG. 2) carries out a proper binarizing operation while taking into account information of related pixels. For this reason, it generates a color data for binarization based upon a color data of a target pixel and a color data of a predetermined related pixel within the image, and based upon the color data for binarization and a threshold value, carries out the binarizing operation. The related pixel satisfies an absolute positional condition for defining absolute positions of pixels within the image and a relative positional condition for defining relative positions of pixels to the target pixel. Further, as will be explained later, this may include a pixel within the image, which satisfies a pixel specifying condition.

The following description will discuss the binarizing operation. First, the image processing section 30 (FIG. 2) selects a target pixel to which the binarizing operation is applied (step 404). The binarizing operation is carried out on all the pixels within an input image; and the target pixel may be selected, for example, from pixels starting with the upper left pixel of the image in the right direction in succession. Thus, the target pixels are selected irrespective of any conditions.

Figure 5:
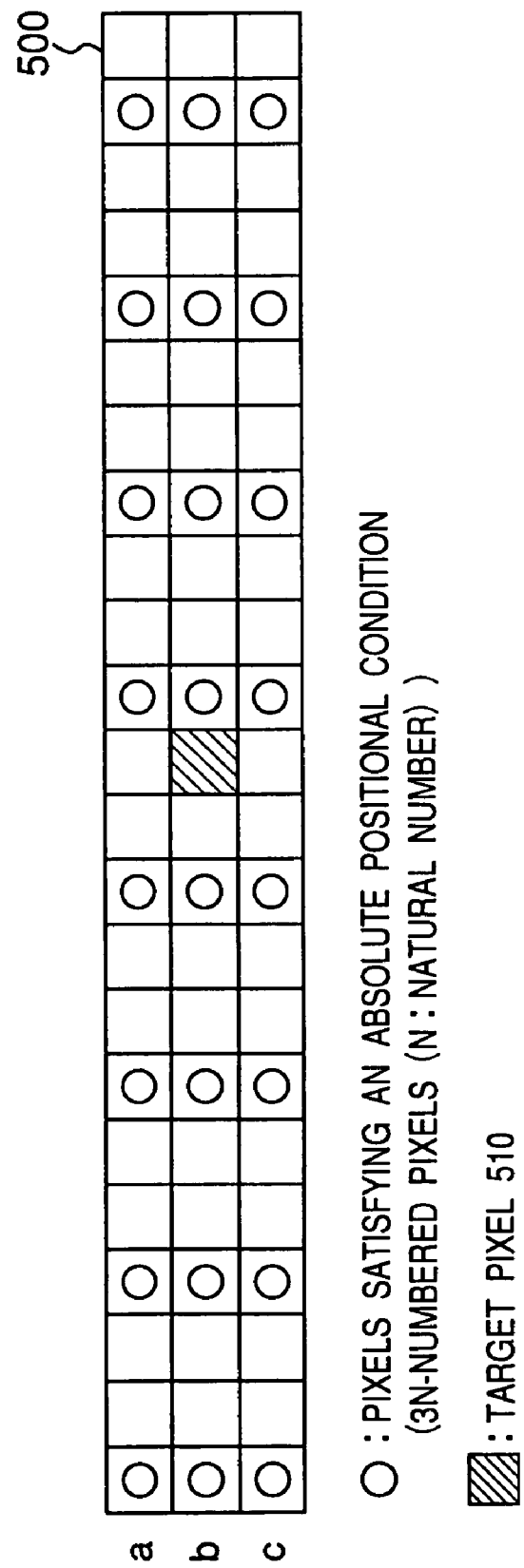
FIG. 5 is a diagram of pixels at 3N-numbered positions (N: natural number) from the pixel on the edge of the image, which conform to an absolute positional condition.

Next, among pixels that satisfy an absolute positional condition, a pixel that satisfies a relative positional condition to the target pixel is selected as a relative pixel (step 406). Here, the absolute positional condition is explained as follows. The absolute positional condition is defined as "the condition which, with respect to a predetermined direction within the image, specifies positions of pixels corresponding to every N-th pixel from the pixel on the edge of the image". More specifically, supposing that the image has a rectangular shape with the longitudinal direction and the lateral direction, "the absolute positional condition" specifies the position of pixels from the pixel on the edge of the image, for example, in the lateral direction of the image (for example, the 3N-numbered pixel from the edge (N: natural number). FIG. 5 shows a group of pixels that conform to such an absolute condition that they are located at 3N-numbered (N: natural number) positions from the pixels on the edge of the image in a partial area 500 within the image. In FIG. 5, the left to right direction is defined as a direction parallel to the lateral direction of the image. The pixels, located at the 3-N numbered positions in the lateral direction, are indicated by "○". Rows a, b and c are shown in the lateral direction which are only examples. With respect to rows other than these, the displays thereof are omitted. Moreover, in FIG. 5, a target pixel 510 is plotted; however, this is given only as a reference, and the absolute positional condition in not dependent on the position of the target pixel 510.

The "relative positional condition" is, on the other hand, defined as "a condition that specifies relative positions of pixels to the target pixel". More specifically, the "relative positional condition" includes the following conditions:

*Condition (1): pixels that include the target pixel and are located on a straight line extending in a predetermined direction defined by the absolute positional condition.

*Condition (2): pixels located within a predetermined range from the target pixel.

The condition (1) is set so as to increase the speed of the process and to reduce the amount of information. In other words, when, upon selecting a relative pixel, both of the pixels in the longitudinal direction and the lateral direction in the image are collated, the amount of information to be held increases, thereby lengthening the processing time. Therefore, this condition is set by taking this point into consideration. In this example, the pixels in the row direction (lateral direction) including the target pixel correspond to this condition, that is, only the pixels on the row b in FIG. 5 satisfies the condition (1). In other words, based upon the condition (1), rows a and c, and the other rows except for this can be excluded so that the amount of information is reduced. The condition (2) limits the positions of the related pixels to a predetermined range from the target pixel since selection of the related pixels from an excessively wide area only causes an increase in the amount of calculations and since relationship with the target pixel becomes smaller in an excessively wide area. For example, the condition is set so as to limit to a range "within 15 pixels" from the target pixel, pixels located within 15 pixels from the target pixel satisfy the condition (2).

Here, a "pixel specifying condition" similar to the "relative positional condition" may be set. The "pixel specifying condition" is used for directly specifying the position from the target pixel in a predetermined direction, and this is set so as to directly select pixels that are likely to be closely related to the target pixel. For example, those pixels corresponding to 3-, 6-, 7- and 9-numbered pixels from the target pixel in the left to right direction, or those pixels corresponding to 1- and 3-numbered pixels from the target pixel, are specified as such. The pixel specifying condition may be set at random.

Figure 6:
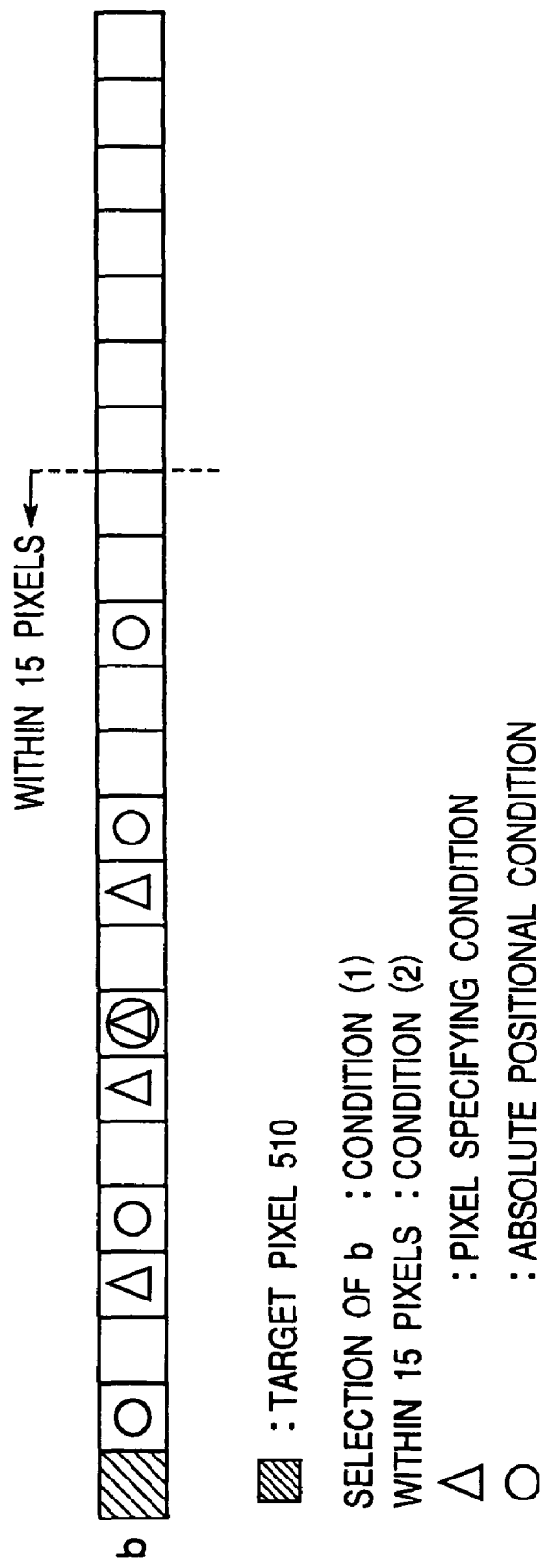
FIG. 6 is a diagram of pixels that satisfy the absolute positional condition, a relative positional condition and a pixel specifying condition.

FIG. 6 shows pixels that satisfy the pixel specifying condition in addition to those pixels that satisfy the above-mentioned absolute positional condition (1) and relative positional condition (2). FIG. 6 shows a case in which the condition (1) is "left to right direction", the condition (2) is "within 15 pixels from the target pixel 510" and the pixel specifying condition is "3-, 6-, 7- and 9-numbered pixels from the target pixel 510 in the left to right direction". FIG. 6 shows only those pixels in the right direction. Those pixels located at positions, each indicated by at lease one of "○" and "Δ" in FIG. 6 are utilized as related pixels. Here, in some cases, the target pixel might satisfy the absolute positional condition. In this case, the target pixel is also dealt as one of the related pixels, and its color data is utilized in the succeeding processes.

Next, the image processing unit 30 (FIG. 2) generates a color data for binarization of the target pixel based upon the color data of the target pixel and color data of the related pixels (step 408). This process is used for generating a color data that is utilized for binarizing the target pixel. In some cases, a general binarizing operation carried out only based upon the color data of the target pixel makes it difficult to provide an appropriate binarizing operation. Therefore, the color data of the target pixel is generated by taking into consideration the color data of the related pixels. In the case when, for example, respective values of R, G and B of the pixels are utilized as a color data of the target pixel and related pixels, the average values of the respective values of R, G and B of the related pixels are generated as the R, G and B values of the target pixel. Moreover, besides the average values of the respective values of R, G and B, the average, difference of contrast, luminance, lightness and density may be utilized. In this manner, the color data for binarization of the target pixel is generated.

Next, based upon the color data for binarization of the target pixel and the threshold value, the target pixel is binarized (step 410). The color data for binarization of the target pixel is obtained at step 408. The image data of the target pixel is binarized based on whether or not the color data for binarization of the target pixel is located within the range of the threshold value. The above-mentioned processes of steps 404 to 410 are repeatedly executed while the target pixel is successively changed so that the binarizing operation is carried out with respect to all the pixels in the image.

Among the pixels satisfying the absolute positional condition, those pixels satisfying the relative positional condition are selected as the related pixels, and based on the color data thereof, the target pixel is binarized so that it is possible to obtain a binarized image in which a target area is more suitably extracted as compared with a case in which the binarizing operation is carried out by utilizing a single threshold value as a whole. For example, in an attempt to prevent counterfeiting acts of paper money, the specified pattern needs to be detected at the time of printing the paper money in both of the cases of new paper money or discolored paper money after long-time use. Therefore, even in the case when there are discolored portions and non-discolored portions in paper money, since color data of the peripheral pixels serving as the related pixels are utilized, it is possible to carry out a uniform binarizing operation as a whole.

Moreover, since the related pixels are selected by using the pixel specifying condition, it is possible to utilize those pixels that are more likely to relate to the target pixel so as to carry out the binarizing operation.

Embodiment 2

In Embodiment 2, an explanation will be given another method for carrying out a binarizing operation. A plurality of threshold values are preliminarily prepared in an image processing apparatus in accordance with the present embodiment. The image processing apparatus selects one of the threshold values based upon a predetermined reference, and applies to the binarizing process. Thus, it is possible to obtain a binarized image in which a specified pattern in the target area is more suitably extracted as compared with a case in which the binarizing operation is carried out by utilizing a single threshold value as a whole.

Here, the image processing apparatus of the present embodiment has the same constituent elements as those explained in the image processing apparatus 100 (FIGS. 1 and 2). For this reason, it is also referred to as "image processing apparatus 100" in the following description. However, even in the case of the same constituent elements, the processing thereof may be different.

First, an explanation will be given of an image processing apparatus 100 (FIG. 2) in the present embodiment. As illustrated in FIG. 2, the image input unit 10 is used for inputting image data to the image processing apparatus 100. In the present embodiment also, the image data is composed of a plurality of pixels, each of which has a color data represented by a pixel value. Here, the greater the number of the pixels and the greater the number of colors represented by the color data, the higher the resolution in the corresponding image, while the smaller the number of the pixels and the smaller the number of colors represented by the color data, the lower the resolution therein. The input image has a resolution of, for example, 600 dpi, or 300 dpi.

The storage unit 20 is a memory, a hard disk and the like, for storing the input image data. The storage unit 20 stores a plurality of threshold values that are used in a binarizing operation in the image processing unit 30.

The image processing unit 30 carries out an image processing on image data. Processes carried out by the image processing unit 30 are described in step 302 to 308 in FIG. 3. In particular, in relation to the step 304 in FIG. 3, the image processing unit 30 gives either a value 1 or 0 to each pixel based upon the color data of the pixel and one threshold value selected from the plurality of threshold values. This process will be described later in detail.

The printer interface 40 used in the case when image data is outputted to the printer 7 (FIG. 1), and also includes functions as a printer controller.

The video interface 50 is used in the case when image data is outputted to the monitor 2 (FIG. 1), and also includes functions as a general video card.

Figure 7:
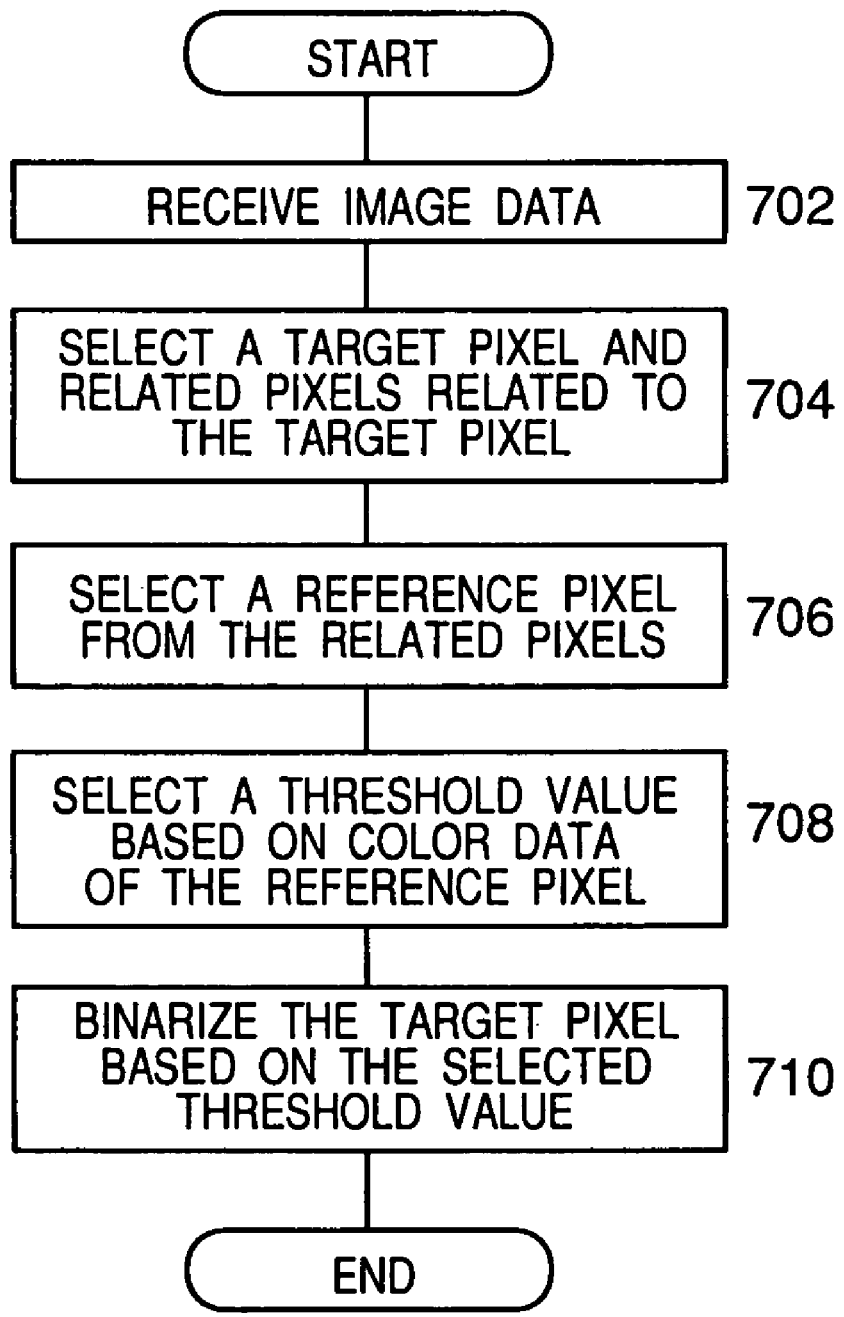
FIG. 7 is a flow chart of processes related to the binarizing operation of the image processing apparatus.

Referring to FIG. 7, an explanation will be given of the image processing apparatus 100. FIG. 7 is a flow chart of processes that relate to a binarizing operation of the image processing apparatus 100 (FIG. 2). First, the image processing apparatus 100 (FIG. 2) receives image data of an input image from the input section 10 (FIG. 2)(step 702), and stores this in a storage unit 20 (FIG. 2). In this example, the resolution of the image is set to 300 dpi that is comparatively low, and the resolution converting step (step 302 in FIG. 3) for reducing the amount of processing is not particularly carried out. However, in the case when the input image has a comparatively high resolution such as 600 dpi, the resolution may be converted to 300 dpi and the like, so as to reduce the amount of processing. In order to carry out the resolution conversion, the image processing unit 30 (FIG. 2) is set to carry out a thinning process on the pixels of the image data.

Any of processes (steps 704 to 710) successively carried out by the image processing unit 30 (FIG. 2) are processes related to a binarizing operation with respect to the reference color. In this binarizing operation, a plurality of threshold values are preliminarily prepared, and the binarizing operation is carried out based upon color data of pixels on which the binarizing is carried out and one of the threshold values selected from the plurality of threshold values. Here, in the present embodiment also, the concept of the binarization, the element threshold values and the definition of the threshold values are the same as those explained in Embodiment 1.

Figure 8:
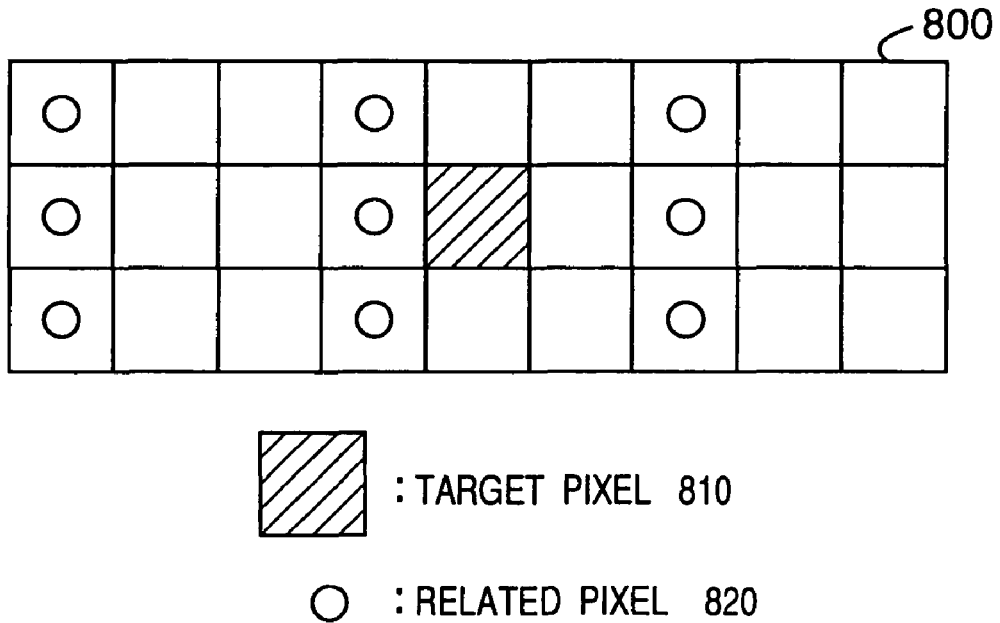
FIG. 8 is a diagram of a target pixel and related pixels within a partial area.

First, the image processing section 30 (FIG. 2) selects a target pixel to which the binarizing operation is applied and related pixels that are related to the target pixel (step 704). The related pixels are not less than one pixel located within a partial area of an image including the target pixels. In other words, these are peripheral pixels located in an area within a predetermined range from the target pixel. Since the binarizing operation is carried out on all the pixels within the input image, the target pixel may be selected, for example, from pixels starting with the upper left pixel of the image in the right direction in succession. FIG. 8 shows a target pixel 810 and related pixels 820 within a partial area 800 in FIG. 8. Every third pixel is selected as a related pixel 820 in the lateral direction within the partial area 800 of lateral 9 pixels×longitudinal 3 pixels. However, the number of pixels in the lateral direction and the longitudinal direction within the partial area 800 are not limited to these numbers. Further, not limited to a rectangular shape, the shape of the partial area 800 may be set to a desired shape such as a round shape and an elliptical shape including the target pixel. Moreover, with respect to the selection of the related pixels, not limited to the regularity of "every third pixer", an appropriate number of pixels within the partial area 800 may be selected at random.

Figure 9:
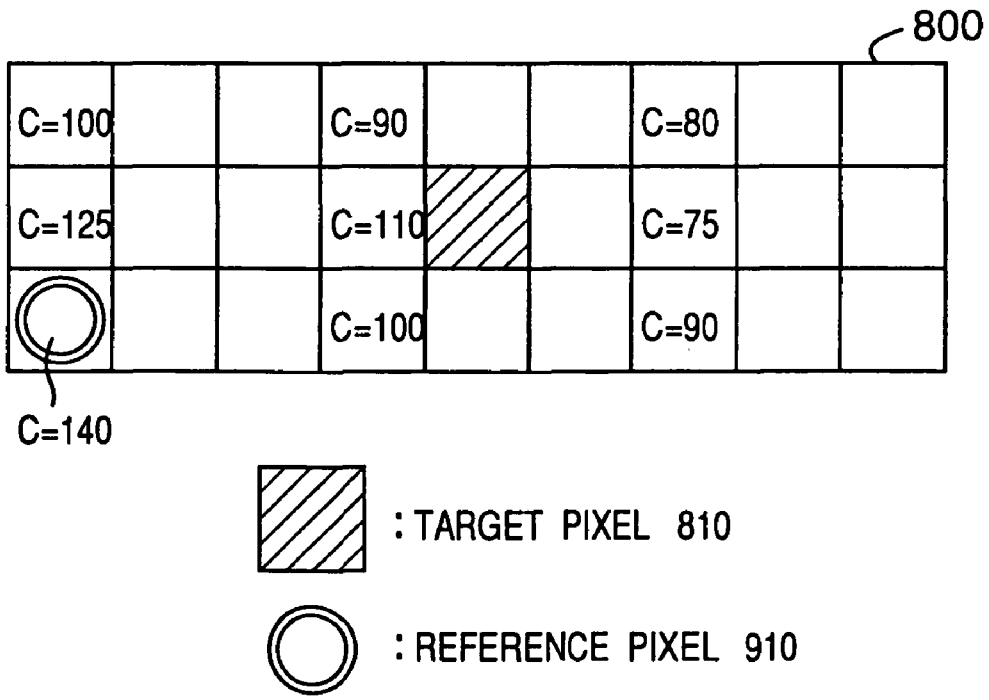
FIG. 9 is a diagram of the relative pixels and a reference pixel that are indicated by density values C.

Next, the image processing unit 30 (FIG. 2) selects a reference pixel (see step 706 of FIG. 7). The reference pixel has a color data that gives a reference at the time of selecting a threshold value. With respect to the selection of the reference pixel, for example, density values of the related pixels 820 are utilized. A color data utilized in the selection of the reference pixels is referred to as "parameter". In this example, the density values form parameters so that the related pixel having the greatest density value C is selected as the reference pixel. FIG. 9 shows respective related pixels 820 (FIG. 8) having density values C (FIG. 8) and a reference pixel 910. The related pixel having the greatest density value C (C=140) is located at a lower left position within the partial area 800 (density value C=140), and this pixel is selected as the reference pixel 910. Here, not limited to the density value, the greatest value of other factors such as luminance, lightness or differences in contrast from the target pixel, may be utilized upon selection of the reference pixel.

Next, the image processing unit 30 (FIG. 2) selects one of the threshold values from the storage unit 20 (FIG. 2) based upon the color data of the reference pixel (step 708 of FIG. 7). The threshold values are classified into not less than 2 divisions depending on the parameter values of the reference pixel. FIG. 10 shows a threshold value table 900 that stores a plurality of threshold values. In this threshold value table 900, the threshold values are prepared in the corresponding divisions. In the case of the density values C as the parameters, they are defined as divisions such as C≧150, 150≧C≧120 and 120>C, and the respective threshold values (R, G, B) are set as (153, 237, 125), (242, 241, 0) and (192, 190, 0) in the decrement order of the density. In this case, since the parameter C of the reference pixel is C=140, this corresponds to 150≧C≧120; thus, the threshold value (242, 241, 0) is selected. Here, supposing that the value of the parameter C of the reference pixel is C≧150, the threshold value (153, 237, 125) is selected, and supposing that it is 120>C, the threshold value (192, 190, 0) is selected. In this case, not limited to three, the number of the divisions and threshold values may be set to 2 or a number not less than 4, if necessary.

When the threshold value has been selected, the image processing unit 30 (FIG. 2) binarizes the target pixel 810 (FIG. 8 and FIG. 9) based upon the threshold value (step 710 in FIG. 7). In this process, predetermined permissible ranges (for example, ±30) are set based upon the respective element threshold values of the set of threshold values, and in the case when all the R, G and B values of the target pixel are within the ranges, 1 is given to the target value, and in the case when any one of the R, G and B values of the target pixel is not in the range, 0 is given as the pixel value of the target pixel. In the case when the threshold values are selected as (242, 241, 0) and when the permissible range is set to ±30, if the R, G and B' values of the target pixel are located within (212, 211, 0) to (272, 271, 30), 1 is given to the target value, and if any of them are not within these ranges, 0 is given to the target pixel.

As described above, from a plurality of threshold values, one of them is selected based upon a color data of the reference pixel, and the target pixel is binarized; thus, it is possible to obtain a binarized image from which a target area is easily extracted. For example, in an attempt to prevent counterfeiting acts of paper money, the specified pattern needs to be detected at the time of printing the paper money in both of the cases of new paper money or discolored paper money after long-time use. Therefore, even in the case of a stained paper money as a whole that causes a thicker image in density as compared with that of new paper money, since the binarizing operation of the present invention determines a threshold value based upon a parameter such as a density value and the like, it is possible to obtain a binarized image in which a target area is more suitably extracted as compared with a case in which the binarizing operation is carried out by utilizing a single threshold value as a whole. In the case when the reference color of a specified pattern to be detected has a higher density as compared with the peripheral portions, even if the density on the paper face of paper money and the like, is relatively high, the binarizing operation is carried out in a manner so as to positively detect the specified pattern. It is possible to carry out a binarizing operation in a manner so as to easily discriminate a desired area to be extracted.

The foregoing descriptions have discussed Embodiments 1 and 2 of the present invention. In these examples, in accordance with a computer program stored in a ROM (not shown) of the image processing unit 30 (FIG. 2), the CPU (not shown) of the image processing unit 30 (FIG. 2) executes the pattern detection process and the binarizing operation. However, these processes may be executed by a hard circuit block installed in the image processing unit 30 (FIG. 2). In the case when the same shape as the specified pattern is detected, the image processing unit 30 (FIG. 2) inhibits the generation of an image resembling closely the received image.

Moreover, one portion or all the portions of the computer program stored in the ROM (not shown) in the image processing unit 30 (FIG. 2) may be stored in another recording medium. The recording medium is a magnetic recording medium such as a hard disk drive and a floppy disk 5a (FIG. 1), an optical recording medium such as an optical disk 9a (FIG. 1), or a semiconductor recording medium such as a flash ROM. Here, the concept of "recording media" includes a storage device such as a computer for providing contents through an electric communication line such as the Internet. Therefore, a server, etc., which stores the computer program for achieving the operation of the present invention and transmits the program to another terminal, is included in the recording medium in which the computer program is recorded.

It will be appreciated by those of ordinary skill in the art that the present invention can be embodied in other specific forms without departing from the spirit or essential characteristics thereof.

The presently disclosed embodiment is therefore considered in all respects to be illustrated and not restrictive.

What is claimed is:

1. An image processing apparatus comprising:
   an input unit for inputting original image data of an image composed of a plurality of pixels, each having a color data;
   a non-transitory storage unit for storing a first condition, wherein the first condition is met if a pixel is in a prescribed absolute position in the original image data and a second condition, wherein the second condition is met if a pixel is in a prescribed position relative to a target pixel in the original image data;
   a selector for selecting a target pixel included in the image data irrespective of the first condition and also selecting at least one related pixel which satisfies the stored first condition and the stored second condition relative to the selected target pixel, such that the target pixel and the at least one related pixel are selected based on different conditions;
   a binarization unit for binarizing the target pixel based upon a color data of the target pixel and that of the at least one related pixel to the target pixel in the image to generate a binarized value; and
   a determination unit for determining whether or not the image has a specified pattern, based upon binarized values obtained by said binarization unit.

2. The image processing apparatus according to claim 1, wherein the binarization unit obtains a color data for binarization based upon the color data of the target pixel and that of the at least one related pixel, and generates the binarized value based upon whether or not the value indicated by the color data for binarization is within a predetermined range.

3. The image processing apparatus according to claim 2, wherein the color data for binarization is obtained based upon an average value between the value of the color data of the target pixel and that of the at least one related pixel.

4. The image processing apparatus according to claim 1, wherein every N pixel from a pixel at an edge of the image in a predetermined direction within the image is the pixel defined in the first condition, and a pixel which exists on a straight line including the target pixel extending in the predetermined direction and which is positioned within a predetermined range from the target pixel is the pixel defined in the second condition.

5. The image processing apparatus according to claim 1, wherein the storage unit stores a third condition defining a position relative to the target pixel in a predetermined direction specified by a user, and wherein the at least one related pixel includes a pixel satisfying the third condition.

6. The image processing apparatus according to claim 1, wherein the determination unit determines whether or not an image element having a shape similar to the specified pattern exists, based upon the binarized values, and when the image element is determined to exist, finely examines the shape of the image element to determine whether or not the specified pattern exists.

7. The image processing apparatus according to claim 6, wherein when the image element is determined to exist, the determination unit inhibits to generate an image resembling closely the image received from the input unit.

8. The image processing apparatus according to claim 1, wherein the absolute positions are fixed with respect to an edge of the image.

9. A non-transitory computer-readable recording medium for recording an image processing computer program comprising the steps of:
   inputting image data of an image composed of a plurality of pixels, each having a color data;
   reading from a storage a first condition, wherein the first condition is met if a pixel is in a prescribed absolute position in the original image data and a second condition, wherein the second condition is met if a pixel is in a prescribed position relative to a target pixel in the original image data;
   selecting a target pixel included in the image data irrespective of the first condition;
   selecting at least one related pixel which satisfies the read first condition and the read second condition relative to the selected target pixel, such that the target pixel and the at least one related pixel are selected based on different conditions;
   binarizing the target pixel based upon a color data of the target pixel and that of at least one related pixel to the target pixel in the image to generate a binarized value; and
   determining whether or not the image has a specified pattern, based upon the binarized values obtained.

10. The non-transitory computer-readable recording medium for recording an image processing computer program according to claim 9, wherein the step of generating the binarized value includes the steps of:
   obtaining a color data for binarization based upon the color data of the target pixel and that of the at least one related pixel; and
   generating the binarized value based upon whether or not the value indicated by the color data for binarization is within a predetermined range, and
   wherein the color data for binarization is obtained based upon an average value between the value of the color data of the target pixel and that of the at least one related pixel.

11. The non-transitory computer-readable recording medium for recording an image processing computer program according to claim 9, wherein every N pixel from a pixel at an edge of the image in a predetermined direction within the image is the pixel defined in the first condition, and a pixel which exists on a straight line including the target pixel extending in the predetermined direction and which is positioned within a predetermined range from the target pixel is the pixel defined in the second condition.

12. The non-transitory computer-readable recording medium for recording an image processing computer program according to claim 9, wherein, in the step of storing, a third condition is stored, the third condition defining a position relative to the target pixel in a the predetermined direction specified by a user, and wherein the at least one related pixel includes a pixel satisfying the third condition.

13. The non-transitory computer-readable recording medium for recording an image processing computer program according to claim 9, wherein the absolute positions are fixed with respect to an edge of the image.

14. An image processing method comprising the steps of:
   inputting image data of an image composed of a plurality of pixels, each having a color data;
   reading from a storage unit a first condition, wherein the first condition is met if a pixel is in a prescribed absolute position in the original image data and a second condition, wherein the second condition is met if a pixel is in a prescribed position relative to a target pixel in the original image data;
   selecting a target pixel included in the image data irrespective of the first condition;
   selecting at least one related pixel which satisfies the read first condition and the read second condition relative to the selected target pixel, such that the target pixel and the at least one related pixel are selected based on different conditions;
   using a processor to binarize the target pixel based upon a color data of the target pixel and color that of at least one related pixel to the target pixel in the image to generate a binarized value; and
   determining whether or not the image has a specified pattern based upon the binarized values obtained.

15. The method of claim 14, wherein the absolute positions are fixed with respect to an edge of the image.

* * * * *